Figure 1:
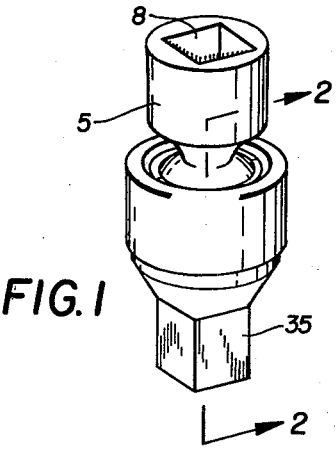

Oct. 22, 1963

A. KOSS 3,107,505

UNIVERSAL JOINT

Filed Feb. 15, 1961

3 Sheets-Sheet 1

INVENTOR.
ADRIAN KOSS
BY
Jordan C. Lack
ATTORNEY

INVENTOR.
ADRIAN KOSS
BY
*Gordon C. Mack*
ATTORNEY

INVENTOR.
ADRIAN KOSS

United States Patent Office 3,107,505
Patented Oct. 22, 1963

3,107,505
UNIVERSAL JOINT
Adrian Koss, Mogadore, Ohio, assignor to Hague Manufacturing Company, Akron, Ohio, a corporation of Ohio
Filed Feb. 15, 1961, Ser. No. 89,437
3 Claims. (Cl. 64—7)

This invention relates to an improved universal joint. It includes a new universal-joint assembly, parts thereof, and the production of such parts. Although the drawings relate more particularly to universals to be used for tools such as for driving nuts, etc., the invention includes also universals made for drives for machine tools, agricultural and road equipment, aircraft, etc., with bodies designed for the particular applications. The universals are designed especially for the transmission of power by impact or with constant pressure.

Each universal joint includes a female member, a male member with a race for each ball bearing, and two or more ball bearings. The female member is fashioned from a metal block and provides a seat for each of the ball bearings. The seats may be at the inner ends of passageways drilled through the wall of the female member or in depressions machined into the wall of the socket in the female member. The strength of the bearing is dependent upon the block from which the female member is fashioned, because any tendency of the ball bearings to spread apart and become separated from the male member is restrained by the female member. The new female members and their preparation are claimed as a part of the invention.

A cap is used to hold the male member in an opening in the female member, and a retaining ring may be used within the cap to relieve the cap from the wear incident to contact with the ball bearings. A new retaining ring has been developed for this purpose and is covered as a part of the invention.

The invention includes universal joints comprising two or more ball bearings. The races in the male members of universals which comprise more than two balls are Bernoullian lemniscates. The centers of the balls are advantageously located within the periphery of the knob of the male member, as explained.

Various improvements have been made in universal joints as described in the specification and shown in the drawings, all of which are covered herein.

The drawings which illustrate the invention show universal joints for use as service tools. The protruding end of the male member is machined to fit a square (or round, hexagonal, etc.) opening, or this protruding end is countersunk to receive a square (or round, hexagonal, etc.) member. Universal joints are shown with the projecting end of the female member machined, others with it countersunk. It is to be understood that such structures are interchangeable and both ends may be the same.

The invention will be further described in connection with the drawings, in which—

Figure 2:
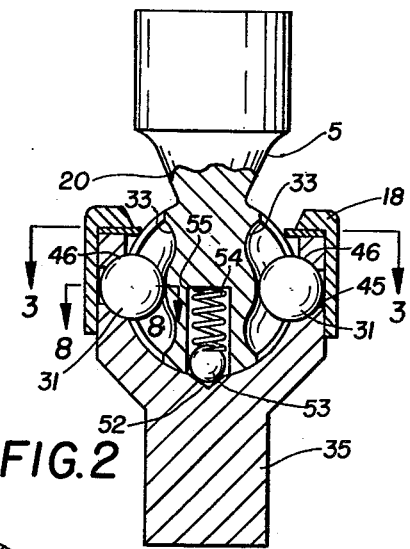
Figure 3:
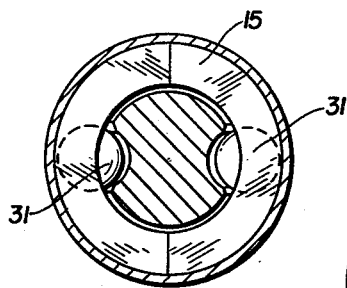
Figure 4:
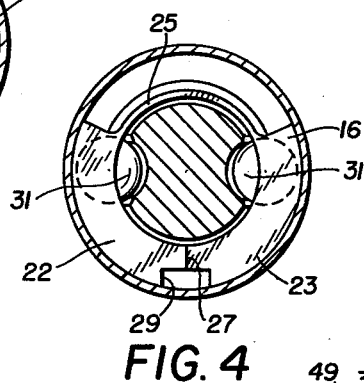
Figure 5:
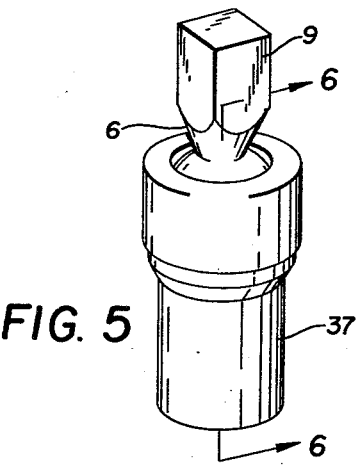
Figure 6:
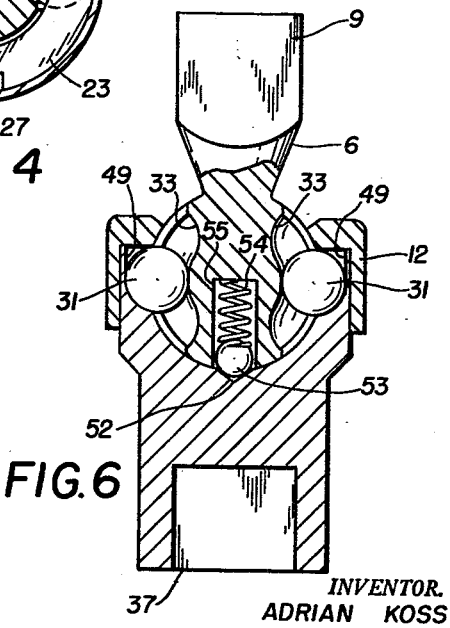
Figure 7:
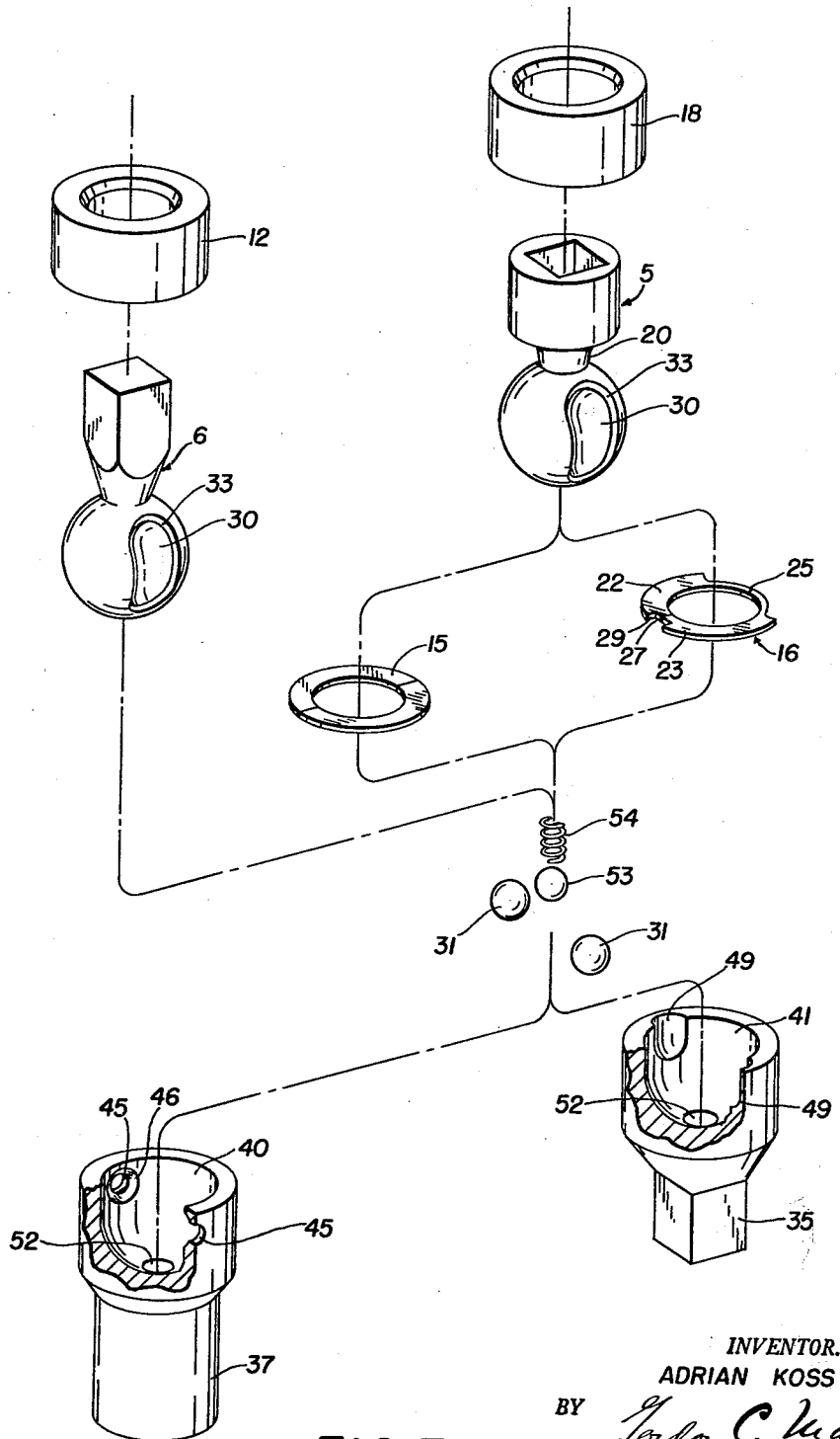
Figure 8:
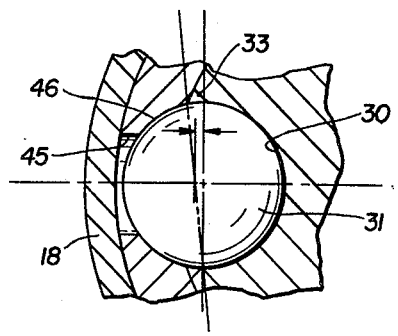
Figure 9:
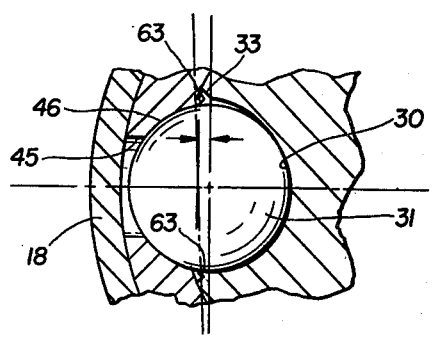
Figure 12:
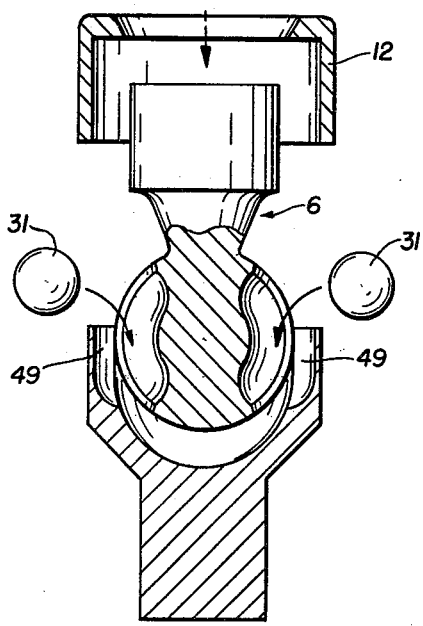
Figure 11:
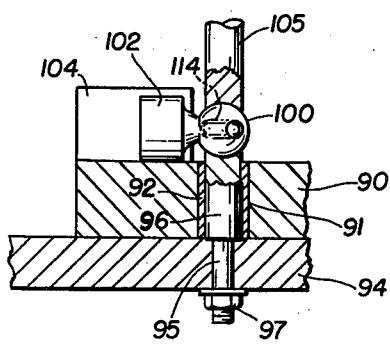
Figure 10:
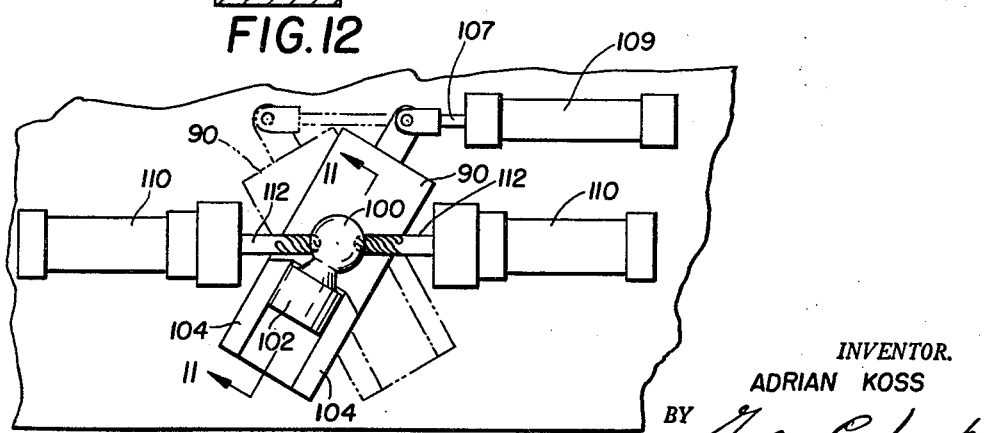

FIG. 1 is an elevation of a two-ball universal joint;
FIG. 2 is a section through the universal joint of FIGURE 1 on the line 2—2 of FIGURE 1 showing the internal structure of the joint;
FIG. 3 is a section on the line 3—3 of FIGURE 1;
FIG. 4 is a similar section through a similar universal joint in which a new type of retaining ring is used;
FIG. 5 is an elevation of a universal joint of different structure;
FIG. 6 is a section through the universal joint of FIGURE 5 on the line 6—6 of FIGURE 5;
FIG. 7 is an exploded view illustrating different assemblies of universal joints from interchangeable parts;
FIG. 8 is a section on the line 8—8 of FIGURE 2 showing the location of a ball bearing in a new universal joint having a female member with milled seat;
FIG. 9 is a section of the same after the surfaces have worn;
FIG. 10 is a plan view of means for simultaneously drilling the races in the male member of a two-ball universal joint;
FIG. 11 is a vertical section on the line 11—11 of FIGURE 10; and
FIG. 12 is an exploded sectional view illustrating the manner of assembling a universal of the general type shown in FIGURE 6.

FIGURES 1–7 illustrate two-ball universals which are typical of universals with two or more balls, except that when the universal comprises more than three balls, the outline of each race in the knob of the male member is a Bernoullian lemniscate, preferably made as described in my application Serial No. 731,299 filed April 28, 1958, now abandoned. The lemniscates are there described as formed simultaneously by milling cutters arranged radially of the center of the knob of the male member and rotated as they are made to encircle the knob in a plane passing through its center while the knob is tilted with respect to that plane at the greatest angle at which the universal is adapted to operate. A six-ball universal is common. Two different types of male members 5 (FIG. 2) and 6 (FIG. 6) are illustrated; that shown in FIGURES 1–3 having an extension which has a square opening at 8 (FIG. 1) to receive a square driving tool. This opening may be any shape. The male member 6 shown in FIGS. 5 and 6 has a square extension 9. This extension may be any shape.

In each of the universal joints there is a cap to hold the different elements in assembled relation, except that in some instances there is a retaining ring inside of a cap for this purpose. If the extension of the male member is sufficiently smaller than the knob portion of this member to permit the cap to be slipped over it (FIGS. 5 and 6), a retaining ring is not necessary although one can be used to relieve the cap 12 (FIGS. 6 and 7) from any wear that results from contact with the ball bearings. Other extensions (FIGS. 1 and 2) are so large that the opening in any cap that will slip over such an extension is too large to hold the male and female members in assembled relation. In such structures a retaining ring 15 or 16 (FIGS. 3 and 4) with a smaller opening than the opening in the cap 18 is used for the purpose. Whatever the design of the female member, the cap 12 or 18 is preferably shrunk in a tight fit against its outer surface.

The cap, whatever the exact structure of the universal, is so constructed and positioned that it acts as a stop for the deflection of the male member, so that the male member cannot be deflected away from its aligned position to form any desired angle of deflection, e.g. 20, 30 or 40 degrees or the like.

Each of the retaining rings 15 and 16 is split so that it can be assembled around the neck 20 (FIGS. 2 and 7) of the male member. The ring 15 is split into two parts and the two halves are brought together about the neck.

The retaining ring 16 is of resilient but abrasion-resistant steel. It comprises the two broad portions 22 and 23 (FIG. 7) which center it within the cap 18. These are joined by the narrow neck portion 25 which acts as a spring, and although it is shown at the inner circumference of the ring annulus, it may be at either the inner or the outer circumference or occupy an intermediate position. The ring is slit at 27 so that the two broader portions 22 and 23 may be opened outwardly against the neck portion 25 of the ring so that the two ends of the ring at the gap thus formed can be slipped around the neck 20 of the female member. The notch 29 is provided for the introduction of a screwdriver or other tool to pry the two ends of the ring apart, to open it. This feature is optional.

The knob of each male member is provided with two (or more) races 30 for the two (or more) ball bearings 31. As explained, if there are more than two balls, the races must conform to the Bernoullian lemniscate configuration. Each race is advantageously champfered at 33 around its edge to accommodate any burrs eventually pushed up on the knob by the rolling action of the ball bearings thereby preventing the binding of the male members in the cavity. In a six-ball universal it is desirable to provide a groove around the knob in a plane perpendicular to its axis, for the same purpose.

The extensions of the female members may be squared at 35 (FIGS. 1, 2, 7) or otherwise machined to be received by a socket, or they may be provided with an opening, such as a square, within the end 37 (FIGS. 5, 6 and 7) as more particularly shown in FIGURE 6.

The socket 40 or 41 (FIG. 7) in the female member is just large enough to receive the knob of its male member. Each female member is machined from a block of metal. Seats for the ball bearings are provided in these by any suitable means. Two entirely different constructions are illustrated in the drawings.

FIGURES 2 and 7 show the ball bearings 31 seated at the inner ends of the drilled openings 45. The seats 46 are milled to a predetermined gauged depth to permit the ball to roll or float freely without rubbing against the cap. The openings 45 may be drilled into the female member from the outside, and their inner ends then used to position the milling heads. The openings 45 may be filled with lubricant.

An alternative seat arrangement is illustrated in FIGUES 6 and 7. By means of a fixture (not shown) which fits into the socket in the female member, openings 49 which open down into the socket are milled into the wall of the socket parallel to the axis of the female member, the number of such openings being equal to the number of ball bearings used. Any number can be employed. The bottoms of the seats thus formed are rounded to conform to the surface of the two ball bearings 31 which are seated there. In this general type of universal, the openings 49 provide a relatively complete nest for the ball bearings, and as compared with the alternative structure (FIGURE 2) in which the ball bearings are held against milled seats, the tendency for the balls to break outward toward the cap is reduced.

Although not necessary, each universal joint is advantageously provided with centering means which causes the male member when free to align itself axially in the female member. For this purpose, a small detent 52 is provided in the bottom of the socket. When the small ball 53 is pressed into it by the coil spring 54 housed in the cylindrical opening 55 in the male member, the two members remain aligned until some force disaligns them. Other aligning means may be used. The use of aligning means is optional.

To assemble this universal joint, each ball bearing is entirely or partially coated with a tacky grease. These treated balls adhere to their seats when placed in them. With the balls all in place, the male member is assembled in the female member, and then the cap, with the retaining ring if one is used, is placed on the female member by press-fitting in a hydraulic or mechanical press or by shrinking it on, or by any suitable procedure.

The assembly of a universal of the general type illustrated in FIGURES 5, 6 and 7 is illustrated in FIGURE 12; the aligning means 51–55 being omitted. The ball bearings are dropped into position in the openings between the aligned races 30 and the openings 49 in the female member. The cap (or the retaining ring under the cap, if one is used) prevents separation of the male and female members and loss of the ball bearings. There is a very small clearance of about 0.001 or 0.002 inch between the ball bearings and the cap (or retaining ring).

FIGURES 8 and 9 are diagrammatic and illustrate the effect of wear on the female member. The center of each ball bearing is within the spherical periphery of the knob of the male member. The dot-dash line of FIGURE 8 shows the position of the force vector between the applied pressure through the male member to the milled ball seat 46 in the female member. As shown, this force vector is outside the true center of the ball bearing, tending to force the ball inward toward the male ball race rather than outward against the cap. This clearly shows the advantage of locating the ball bearings in races with beveled edges, and with the center of each ball bearing located inside the plane of the outside line of contact between the ball bearing and its seat so that the force transmitted to the ball through the female member presses the ball against the male member and not against the retaining wall of the female member and the cap 18. This inward movement is due to the cam action applied to the periphery of the ball bearings at a point outside the true center of the ball bearings. At high revolutions under load, centrifugal forces are counteracted by the aforementioned cam action against the ball bearings, tending to push them toward the true center of the assembly. The shift of the ball bearing centers inward toward the true center of the knob has been mathematically and imperically determined, and varies in ratio to the diameters of the knob and the ball bearings as well as applied torques. Eventually, if used for a sufficient period, a burr 63 (FIG. 9) develops on the seat. This is accommodated in the chamfered edge 33 of the race.

FIGURES 10 and 11 illustrate equipment that can be used for simultaneously forming two races in opposite surfaces of a male member. Races formed in this way are made under conditions which duplicate the movement of the balls in a two-ball universal in use, so there is no play of the balls in the races that are formed.

The base 90, provided with hole 91 and bearing 92, is held swively upon any suitable support 94 by the round extension 95 of a pivot 96 which is threaded at its end and held by nut 97. The top of the pivot is cupped so that the knob 100 of any male member fits in it exactly. The extension 102 of the male member fits in a trough provided by the guides 104. The guides are shaped to hold a rounded extension (as shown) or an extension that is square or any other shape. The clamping member 105 (omitted from FIGURE 12 for clarification) is fastened down against the knob by any suitable means, so that the knob can be twisted between the top of the pivot and the clamping member as the base 90 is pivoted about the pivot 96 by the piston rod 107 which is reciprocated in and out of the air or hydraulic cylinder 108. Any suitable means for imparting reciprocal rotation to the base 90 may be used, such as a rack operating on a pinion concentric with the knob 100.

The drills 110 are stationary. The bits 112 are gradually extended toward the center of the knob as they gradually cut opposite races 114 in the opposite surfaces of the knob. The bits have spherical ends of just the diameter of the ball bearings, so the races they cut exactly accommodate the movements of the balls in use. The edges of the races are advantageously later champfered, as explained above, but this is not necessary.

The construction of this invention which eliminates the use of an intermediate ball retaining cage lends itself to the economical manufacture of the universals down to the point of miniaturization. This is particularly evident in the case of producing constant velocity universals which are needed in small precision drives and heretofore could not be produced economically by other means.

Although specific details are shown and described in connection with the universal joints illustrated in the drawings, it is to be understood that such features are interchangeable, and the universal may contain two or more bearings; it being understood that the outline of the races on the knobs of the male members which contain more than two ball bearings are Bernoullian lemniscates. Modifications which will suggest themselves to the man skilled in the art, are contemplated.

The invention is covered in the claims which follow.

What I claim is:

1. A universal joint which includes a male member with a spherical knob movable in a female member, ball bearings each held partly in the female member and partly in a race in the male member, each ball bearing being snugly held between said two members, the center of each ball bearing being within the spherical periphery of the knob of the male member.

2. A universal joint which includes a male member with a spherical knob movable in a female member, ball bearings each held snugly partly on a seat in the female member and partly in a race in the male member, and the center of each ball bearing being located radially inward from the plane of the outer edge of the seat.

3. A universal joint which comprises a male member with a knob at one end, a female member provided with a socket with the knob of the male member held therein, a number of openings through the wall of the female member the inner end of each of which openings is milled into a spherical seat, the same number of races in the knob, a cap over said knob on the male member which is fastened to the female member with the wall thereof closing the outer ends of said openings through the wall of the female member, and a ball bearing snugly located in each of said seats and races.

References Cited in the file of this patent

UNITED STATES PATENTS

| | | |
|---|---|---|
| 1,021,924 | Fetzer | Apr. 2, 1912 |
| 1,294,583 | Whisler | Feb. 18, 1919 |
| 1,591,398 | Newbold | July 6, 1926 |
| 1,622,425 | Dwyer | Mar. 29, 1927 |
| 1,675,065 | Thomas | June 26, 1928 |
| 1,838,310 | Hubbel | Dec. 29, 1931 |
| 1,854,897 | Ganster | Apr. 19, 1932 |
| 1,975,758 | Stuber | Oct. 2, 1934 |
| 2,382,947 | Brozek | Aug. 14, 1945 |
| 2,491,306 | Feitl | Dec. 13, 1949 |
| 2,646,669 | Barbier | July 28, 1953 |
| 2,653,456 | Heym | Sept. 29, 1953 |
| 2,766,512 | Hatebur | Oct. 16, 1956 |
| 2,968,936 | Croset | Jan. 24, 1961 |

FOREIGN PATENTS

| | | |
|---|---|---|
| 722,653 | France | Sept. 1, 1931 |
| 852,219 | France | Oct. 23, 1938 |
| 408,660 | Great Britain | Apr. 16, 1934 |